United States Patent
Chun et al.

(10) Patent No.: US 8,553,634 B2
(45) Date of Patent: Oct. 8, 2013

(54) METHOD FOR PERFORMING BANDWIDTH REQUEST PROCESS IN WIRELESS COMMUNICATION SYSTEM

(75) Inventors: Jin Young Chun, Anyang-si (KR); Ki Seon Ryu, Anyang-si (KR); Sung Ho Park, Anyang-si (KR); Hee Jeong Cho, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 13/128,159

(22) PCT Filed: Aug. 26, 2009

(86) PCT No.: PCT/KR2009/004755
§ 371 (c)(1),
(2), (4) Date: May 6, 2011

(87) PCT Pub. No.: WO2010/053252
PCT Pub. Date: May 14, 2010

(65) Prior Publication Data
US 2011/0205997 A1  Aug. 25, 2011

Related U.S. Application Data

(60) Provisional application No. 61/112,191, filed on Nov. 7, 2008, provisional application No. 61/120,065, filed on Dec. 5, 2008, provisional application No. 61/138,891, filed on Dec. 18, 2008, provisional application No. 61/145,118, filed on Jan. 16, 2009, provisional application No. 61/145,115, filed on Jan. 16, 2009, provisional application No. 61/145,586, filed on Jan. 19, 2009.

(30) Foreign Application Priority Data

Mar. 5, 2009  (KR) .................. 10-2009-0018990
Apr. 27, 2009  (KR) .................. 10-2009-0036692

(51) Int. Cl.
*H04W 4/00* (2009.01)
*H04J 3/16* (2006.01)

(52) U.S. Cl.
USPC .......................................... 370/329; 370/468

(58) Field of Classification Search
None
See application file for complete search history.

(56) References Cited

U.S. PATENT DOCUMENTS 6,028,860 A * 2/2000 Laubach et al. ......... 370/395.64
6,111,863 A * 8/2000 Rostoker et al. ............. 370/329

(Continued)

FOREIGN PATENT DOCUMENTS

EP  1 883 175 A1  1/2008
EP  1 981 223 A1  10/2008

(Continued)

OTHER PUBLICATIONS

IEEE 802.16/2004, "IEEE standards for local and metropolitan area network-Part 16: Air Interface for Fixed and Mobile Broadband Wireless Access Systems" Oct. 2004, pp. 141-151.

(Continued)

*Primary Examiner* — Hassan Phillips
*Assistant Examiner* — Hicham Foud
(74) *Attorney, Agent, or Firm* — McKenna Long Aldridge LLP

(57) ABSTRACT

A bandwidth request procedure is performed in a wireless communication system by transmitting a bandwidth request indicator and a bandwidth request message through a bandwidth request channel; receiving an uplink grant message indicating uplink radio resource in response to the bandwidth request indicator and the bandwidth request message; and transmitting uplink data after receiving the uplink grant message, wherein the uplink grant message includes information regarding the type of the uplink grant message.

4 Claims, 10 Drawing Sheets

(56) References Cited

U.S. PATENT DOCUMENTS

| | | | |
|---|---|---|---|
| 7,873,023 B2* | 1/2011 | Ihm et al. | 370/349 |
| 8,064,476 B2* | 11/2011 | Zhu et al. | 370/437 |
| 2004/0114504 A1* | 6/2004 | Jung et al. | 370/203 |
| 2005/0068931 A1 | 3/2005 | Cho et al. | |
| 2006/0034219 A1 | 2/2006 | Gu et al. | |
| 2007/0047553 A1 | 3/2007 | Matusz et al. | |
| 2007/0097936 A1 | 5/2007 | Lee et al. | |
| 2007/0291692 A1 | 12/2007 | Choi et al. | |
| 2007/0291719 A1 | 12/2007 | Demirhan et al. | |
| 2008/0139216 A1 | 6/2008 | Lee et al. | |
| 2008/0159334 A1 | 7/2008 | Venkatachalam et al. | |
| 2008/0240059 A1 | 10/2008 | Kang | |
| 2008/0304448 A1* | 12/2008 | Hosein | 370/329 |
| 2009/0129404 A1* | 5/2009 | Wu et al. | 370/468 |
| 2009/0274041 A1 | 11/2009 | Chou et al. | |
| 2009/0274120 A1* | 11/2009 | Chou | 370/331 |
| 2009/0323602 A1* | 12/2009 | Li et al. | 370/329 |
| 2010/0008331 A1* | 1/2010 | Li et al. | 370/335 |
| 2010/0027457 A1* | 2/2010 | Okuda | 370/315 |
| 2010/0260137 A1* | 10/2010 | Vrzic et al. | 370/330 |
| 2010/0278123 A1* | 11/2010 | Fong et al. | 370/329 |
| 2010/0278221 A1* | 11/2010 | Ql et al. | 375/219 |
| 2010/0322329 A1* | 12/2010 | Yoo et al. | 375/260 |
| 2010/0329197 A1* | 12/2010 | Boariu et al. | 370/329 |
| 2011/0013717 A1* | 1/2011 | Josiam et al. | 375/295 |
| 2011/0103342 A1 | 5/2011 | Cho et al. | |
| 2011/0110240 A1 | 5/2011 | Bergquist et al. | |
| 2011/0286420 A1 | 11/2011 | Cho et al. | |

FOREIGN PATENT DOCUMENTS

| | | |
|---|---|---|
| KR | 10-2007-0009549 A | 1/2007 |
| RU | 2 315 433 | 1/2006 |

OTHER PUBLICATIONS

Sang-Jin Kim, Woo-Jae Kim, Young-Joo Suh, "Efficient Bandwidth Request Mechanism for Non-real-time Service in IEEE 802.16 system", Proceedings of Korea Institute of Information Scientists and Engineers Fall Conference 2006, vol. 33, No. 2 (D), Oct. 2006, pp. 415-420 (with English Abstract).

Cheng-Yueh Liu et al., "An Adaptive Bandwidth Request Scheme for QoS Support in WiMAX Polling Services", ICDCS'08, Jun. 17, 2008, pp. 60-65.

* cited by examiner

METHOD FOR PERFORMING BANDWIDTH REQUEST PROCESS IN WIRELESS COMMUNICATION SYSTEM

This application is a National Stage Application, under 35 U.S.C. §371, based on International Application No. PCT/KR2009/004755, filed Aug. 26, 2009, which is incorporated herein by reference in its entirety. This application also claims the benefit of priority of U.S. Provisional Application No. 61/112,191 filed on Nov. 7, 2008; U.S. Provisional Application No. 61/120,065 filed on Dec. 5, 2008; U.S. Provisional Application No. 61/138,891 filed on Dec. 18, 2008; U.S. Provisional Application No. 61/145,118 filed on Jan. 16, 2009; U.S. Provisional Application No. 61/145,115 filed on Jan. 16, 2009; U.S. Provisional Application No. 61/145,586 filed on Jan. 19, 2009; Korean Patent Application No. 10-2009-0018990 filed on Mar. 5, 2009 and Korean Patent Application No. 10-2009-0036692 filed on Apr. 27, 2009, all of which are incorporated by reference in their entirety herein.

BACKGROUND OF THE INVENTION

1. Field of the Invention

The present invention relates to wireless communication and, more particularly, to a method for performing a bandwidth request procedure.

2. Description of the Related Art

An IEEE (Institute of Electrical and Electronics Engineers) 802.16 standard provides techniques and protocols to support a broadband wireless access. Its standardization started in 1999 and IEEE 802.16-2001 was approved in 2001. The IEEE 802.16 standard is based on a single carrier physical layer called 'WirelessMAN-SC'. Later, besides the 'WirelessMAN-SC', 'WirelessMAN-OFDM' and 'WirelessMAN-OFDMA' were added to a physical layer in IEEE 802.16a standard approved in 2003. After the IEEE 802.16a standard was completed, a revised IEEE 802.16-2004 standard was approved in 2004. IEEE 802.16-2004/Cor1 was finalized in the form of 'corrigendum' in 2005 in order to resolve and correct bugs and errors of the IEEE 802.16-2004 standard.

Currently, the IEEE 802.16 broadband wireless access working group is conducting standardization of an IEEE 802.16m based on IEEE 802.16e. The IEEE 802.16m has evolved from the IEEE 802.16e.

Communication between a base station and a terminal is performed by a downlink (DL) transmission from the base station to the terminal and an uplink (UL) transmission from the terminal to the base station. The conventional IEEE 802.16e-based system profile supports a TDD (Time Division Duplex) scheme in which a downlink transmission and an uplink transmission are divided by time domains. The TDD scheme is a scheme in which an uplink transmission and a downlink transmission are performed during a different time period while using the same frequency band. The TDD scheme is advantageous in that frequency selective scheduling is simple because uplink channel characteristics and downlink channel characteristics are reciprocal. In IEEE 802.16m, an FDD (Frequency Division Duplex) scheme, as well as the TDD scheme, is considered. The FDD scheme is a scheme in which a downlink transmission and an uplink transmission are performed simultaneously through different frequency bands. In the IEEE 802.16e, a 5 ms frame of the TDD scheme is used, while in the IEEE 802.16m, an 20 ms superframe is considered to use both the TDD scheme and the FDD scheme.

In the IEEE 802.16e, when a mobile station (MS) has data to be transmitted to uplink, it performs a bandwidth request (BW REQ) procedure. The bandwidth request procedure in the IEEE 802.16e includes 4 steps: (1) transmitting a bandwidth request indicator; (2) transmitting a response message with respect to the bandwidth request indicator; (3) transmitting a bandwidth request message; (4) transmitting an uplink grant message; and (5) transmitting uplink data. One of predetermined orthogonal codes is selected as the bandwidth request indicator and transmitted through a contention-based channel. When the bandwidth request indicator transmitted by the MS does not collide with a bandwidth request indicator from a different MS, a base station (BS) transmits an uplink grant message for a bandwidth request message transmission in response to the bandwidth request indicator. Table 1 below shows an example of the uplink grant message for a bandwidth request message transmission.

TABLE 1

| Syntax | Size (bit) | Notes |
| --- | --- | --- |
| CDMA_Allocation_IE0 { | — | — |
| Duration | 6 | — |
| UIUC | 4 | UIUC for transmission |
| Repetition Coding Indication | 2 | 0b00: No repetition coding<br>0b01: Repetition coding of 2 used<br>0b10: Repetition coding of 4 used<br>0b11: Repetition coding of 6 used |
| Frame Number Index | 4 | LSBs of relevant frame number |
| Ranging Code | 8 | — |
| Ranging Symbol | 8 | — |
| Ranging subchannel | 7 | — |
| BW request mandatory | 1 | 1: Yes<br>0: No |
| } | — | — |

Upon receiving the uplink grant message, the MS transmits a bandwidth request message through determined radio resource. The bandwidth request includes information such as a connection identifier (CID) of the MS, the size of requested radio resource, and the like.

Upon receiving the bandwidth request message, the BS transmits an uplink grant message including information regarding the size and position of uplink radio resource for an uplink data transmission to the MS having the corresponding CID. Table 2 below shows an example of an uplink grant message for an uplink data transmission.

TABLE 2

| Syntax | Size (bit) | Notes |
| --- | --- | --- |
| UL-MAP_IE0 { | | — |
| CID | 16 | — |
| Start Time | 11 | — |
| Subchannel Index | 5 | — |
| UIUC | 4 | — |
| Duration | 10 | In OFDM symbols |
| Midamble repetition interval | 2 | 0b00: Preamble only |

TABLE 2-continued

| Syntax | Size (bit) | Notes |
|---|---|---|
|  |  | 0b01: Interval 5: Midamble after every 4 data |
|  |  | 0b10: Interval 9: Midamble after every 8 data |
|  |  | 0b11: Interval 17: Midamble after every 16 data symbols |
| if(UIUC==4) |  | — |
|   Focused_Contention_IE( ) | 16 | — |
| if(UIUC==13) |  | — |
|   Subchannelized_Network_Entry_IE( ) | 12 | — |
| if(UIUC==15) |  | — |
|   UL_Extended_IE( ) | variable | See subclause |
| Padding nibble, if needed | 4 | Completing to nearest byte, shall be set to 0x0 |
| } | — | — |

The MS transmits uplink data through uplink radio resource indicated by the uplink grant message for an uplink data transmission. In transmitting the uplink data, a header including the CID of the MS and a CRC (cyclic redundancy check) for checking an error of data are added to the uplink data.

The IEEE 802.16m adopts various communication services such as an E-MBS (Enhanced Multicast Broadcast Service) for various multimedia services, a multi-hop relay for improving a service in a shadow area, a femto-cell for a high capacity service at homes or in offices. A macro-cell, a relay BS and a femto-cell may use different frequency bands in order to reduce interference. When numerous relay BSs or femto-cells are disposed in a macro-cell, inter-cell handover will be frequently performed, and accordingly, the MS will frequently perform a bandwidth request procedure. Besides, in continuously proving a high capacity real-time service like video communication, delay in the bandwidth request procedure may lead to a degradation of QoS (Quality of Service).

Thus, a method for effectively performing a bandwidth request procedure is required in order to improve QoS of a wireless communication system.

SUMMARY OF THE INVENTION

Accordingly, an object of the present invention is to provide a method for effectively performing a bandwidth request procedure.

To achieve these and other advantages and in accordance with the purpose of the present invention, as embodied and broadly described herein, the present invention provides a method for performing a bandwidth request procedure in a wireless communication system, including: transmitting a bandwidth request indicator and a bandwidth request message through a bandwidth request channel; receiving an uplink grant message indicating uplink radio resource in response to the bandwidth request indicator and the bandwidth request message; and transmitting uplink data after receiving the uplink grant message, wherein the uplink grant message includes information regarding the type of the uplink grant message.

According to an exemplary embodiment of the present invention, a bandwidth request procedure can be performed quickly and effectively.

DETAILED DESCRIPTION OF THE INVENTION

The following technique may be used in various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented by a radio technology such as universal terrestrial radio access (UTRA) or CDMA2000. The TDMA may be implemented by a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. The UTRA is a part of a universal mobile telecommunications system (UMTS). 3GPP (3$^{rd}$ Generation, Partnership Project) LTE (Long Term Evolution) is a part of an evolved UMTS (E-UMTS) using the E-UTRA, which employs the OFDMA in downlink and the SC-FDMA in uplink. IEEE 802.16m is an evolution of the IEEE 802.16e.

For clarification, the IEEE 802.16m will be mainly described, but the technical concept of the present invention is not meant to be limited thereto.

Figure 1:
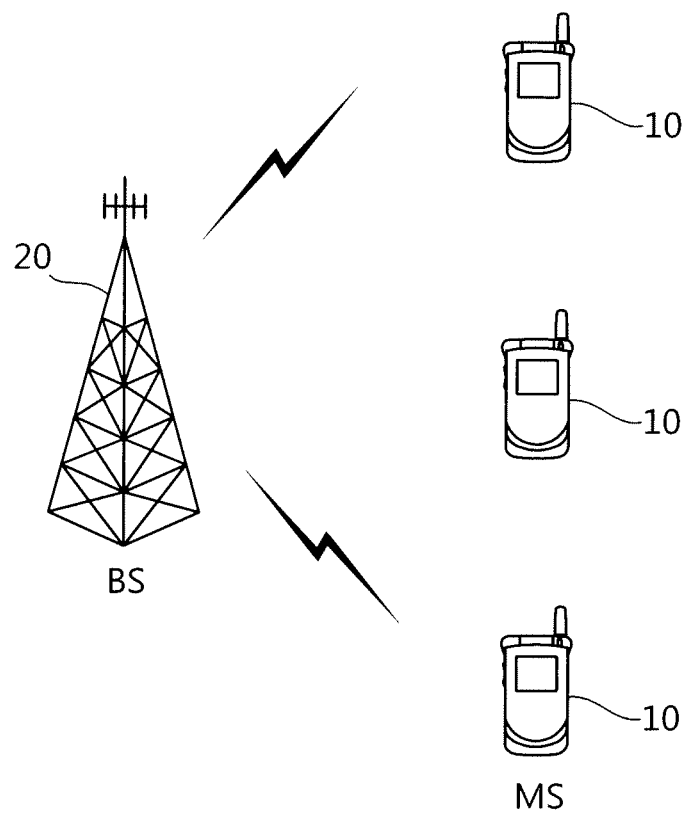
FIG. 1 is a view showing a wireless communication system.

FIG. 1 illustrates a wireless communication system.

With reference to FIG. 1, the wireless communication system includes at least one base station (BS) 20. Each BS 20 provides a communication service to particular geographical areas (which are generally called cells). Each cell may be divided into a plurality of areas (which are called sectors). A mobile station (MS) 10 may be fixed or mobile, and may be referred to by other names such as user equipment (UE), user terminal (UT), subscriber station (SS), wireless device, personal digital assistant (PDA), wireless modem, handheld device, etc. The BS 20 generally refers to a fixed station that communicates with the MS 10 and may be called by other names such as evolved-node B (eNB), base transceiver system (BTS), access point (AP), etc.

Hereinbelow, downlink (DL) refers to communication from the BS to the MS, and uplink (UL) refers to communication from the MS to the BS. In downlink, a transmitter may be a part of the BS and a receiver may be a part of the MS. In uplink, a transmitter may be a part of the MS and a receiver may be a part of the BS.

Figure 2:
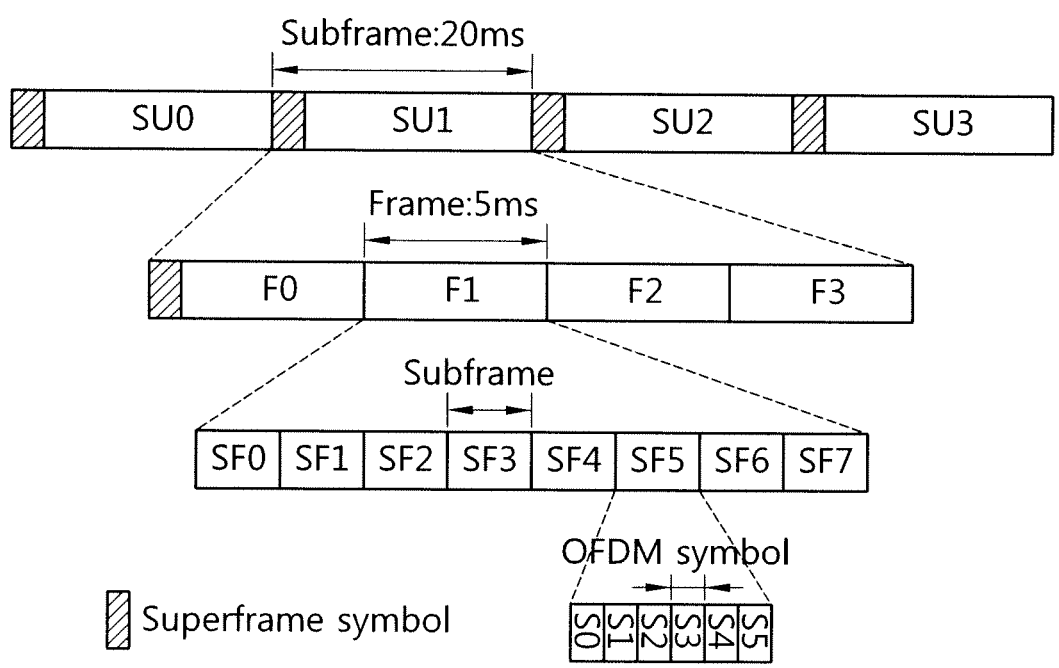
FIG. 2 shows an example of a frame structure.

FIG. 2 shows an example of a frame structure.

With reference to FIG. 2, a super frame includes a superframe header and four frames (F0, F1, F2, and F3). It is illustrated that each superframe has a size of 20 ms and each frame has a size of 5 ms, but the present invention is not meant to be limited thereto. The superframe header may be disposed at the headmost portion, to which a common control channel is allocated. The common control channel is a channel used to transmit control information that can be commonly utilized by every UE in a cell, such as information regarding frames constituting the superframe or system information.

One frame includes eight subframes (SF0, SF1, SF2, SF3, SF4, SF5, SF6, and SF7). Each subframe may be used for an uplink or downlink transmission. Each subframe may include six or seven OFDMA symbols, but it is merely illustrative. A time division duplexing (TDD) scheme or a frequency division duplexing (FDD) scheme may be applied to the frame. In the TDD scheme, each subframe is used for an uplink transmission or downlink transmission during a mutually different time period at the same frequency. Namely, subframes in a frame of the TDD scheme are categorized into uplink subframes and downlink subframes in a time domain. In the FDD scheme, each subframe is used for an uplink transmission or downlink transmission at mutually different frequencies during the same time period. Namely, the subframes in a frame of the FDD scheme are categorized into uplink subframes and downlink subframes in a frequency domain. The uplink transmission and the downlink transmission may occupy mutually different frequency bands and may be performed at the same time.

A subframe includes at least one frequency partition. The frequency partition includes at least one physical resource unit (PRU). The frequency partition may include localized PRUs and/or distributed PRUs. The frequency partition may be used for the purpose of fractional frequency reuse (FFR) or multicast and broadcast services (MBS).

The PRU is defined as a basic physical unit for a resource allocation including a plurality of contiguous OFDM symbols and a plurality of contiguous subcarriers. The number of OFDM symbols included in a PRU may be equal to the number of OFDM symbols included in a single subframe. For example, if a single subframe includes six OFDM symbols, a PRU may be defined to include 18 subcarriers and six OFDM symbols. A logical resource unit (LRU) is a basic logical unit for a distributed resource allocation and a localized resource allocation. The LRU is defined by a plurality of OFDM symbols and a plurality of subcarriers, and includes pilots used in the PRU. Accordingly, the appropriate number of subcarriers in a single LRU is dependent upon the number of allocated pilots.

A distributed resource unit (DRU) may be used to obtain a frequency diversity gain. The DRU includes a group of subcarriers distributed in a single frequency partition. The size of the DRU is equal to the PRU. A minimum unit of forming the DRU is one subcarrier.

A contiguous resource unit (CRU) or a localized resource unit may be used to obtain a frequency selective scheduling gain. The CRU includes a localized subcarrier group. The size of the CRU is equal to the PRU.

A bandwidth request procedure will now be described. The bandwidth request procedure is a procedure in which a mobile station (MS) requests a base station (BS) to allocate radio resource in order to perform an uplink transmission. The MS is allocated uplink radio resource through the bandwidth request procedure and transmit uplink data.

<Uplink Data Transmission after Power of MS is Turned on or after Handover is Performed>

Figure 3:
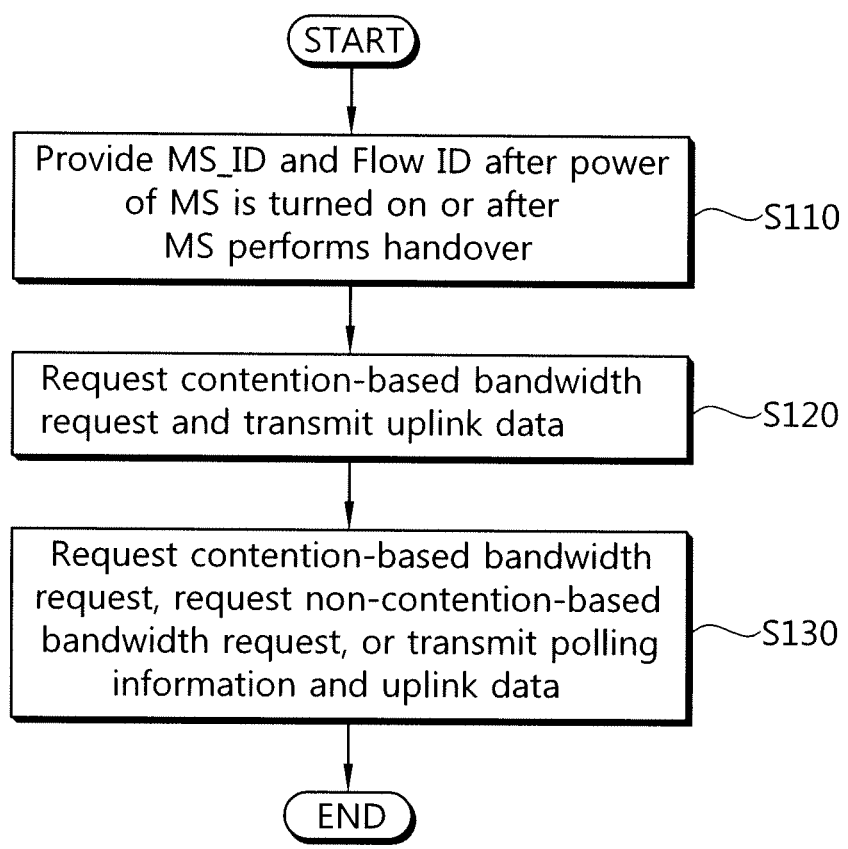
FIG. 3 is a flow chart illustrating the process of transmitting uplink data according to an exemplary embodiment of the present invention.

FIG. 3 is a flow chart illustrating the process of transmitting uplink data according to an exemplary embodiment of the present invention.

With reference to FIG. 3, when power of the MS is turned on in a cell area of the BS, or when the MS performs handover from a neighbor cell, the MS is assigned an MS_ID for identifying the MS and a flow ID for a connection to a particular service from the BS (S110). The flow ID refers to an ID with respect to a service used for the MS to set a particular service (e.g., a voice call, a video call, a control information transmission, and the like). Since various services may be provided to one MS, the MS can be assigned several flow IDs. The flow ID may denote the presence or absence of periodicity of a service.

The MS performs a contention-based bandwidth request (BW REQ) procedure (S120). The contention-based bandwidth request procedure is performed such that the MS transmits a sequence selected from among predetermined orthogonal codes via a bandwidth request channel competitively defined with different MSs. The bandwidth request channel includes radio resource by which the MS can transmit a bandwidth request sequence and a bandwidth request message. The bandwidth request channel includes a plurality of bandwidth request tiles. The bandwidth request tiles may be distributed to frequency domain or time domain. Each of the bandwidth request tiles includes a plurality of contiguous subcarriers on a plurality of OFDM symbols. For example, a bandwidth request channel may include three distributed bandwidth request tiles. The bandwidth request tiles may be defined as six contiguous subcarriers on six OFDM symbols. The contention-based bandwidth request procedure includes a 3-step bandwidth request procedure and a 5-step bandwidth request procedure. The 3-step bandwidth request procedure is obtained by reducing the process of the 5-step bandwidth request procedure, to thus transmit uplink data more quickly. When the 5-step bandwidth request procedure is a general bandwidth request procedure, the 3-step bandwidth request procedure may be a quick bandwidth request procedure. The process of the 3-step bandwidth request procedure and that of the 5-step bandwidth request procedure will be described later. Through the contention-based bandwidth request procedure, the MS is allocated uplink radio resource and transmits early uplink data. If the period of the service corresponding to the flow ID provided to the MS and the size of data are fixed, the BS may allocate uplink radio resource to the MS without a bandwidth request from the MS.

After transmitting the uplink data to the BS, the MS may transmit following uplink data by using a non-contention-based bandwidth request procedure or polling information (Polling IE (Information Element)) (S130). The non-contention-based bandwidth request procedure may be performed when the BS already knows about a sequence to be used by the MS to request bandwidth or when particular radio resource is designated for a bandwidth request so that the MS can make a bandwidth request without contention with a different terminal. The polling information is periodically provided with respect to QoS (Quality of Service) and traffic characteristics. In a state in which the MS has transmitted the uplink data, when uplink data to be transmitted thereafter is data of a flow corresponding to a service without periodicity, the MS performs the contention-based bandwidth request procedure to transmit uplink data. When the uplink data to be transmitted by the MS is data of a flow corresponding to a service with periodicity or when the size of data changes, the BS may designate radio resource for a non-contention-based bandwidth request of the MS or transmit a bandwidth request header by using polling information. The service having periodicity or having data whose size changes may include real-time services such as a streaming service, a real-time polling service (rtPS), an extended real-time polling service (ertPS).

Thus, since the MS can make the bandwidth request using the non-contention-based bandwidth request or polling information, without performing the contention-based bandwidth request procedure, with respect to the uplink data to be transmitted thereafter, delay caused by a bandwidth request failure which may occur in the contention-based bandwidth request procedure. In the non-contention-based bandwidth request procedure, separate radio resource must be allocated to the MS, potentially causing overhead. Thus, in order to reduce overhead that may be generated in the non-contention-based bandwidth request procedure and reduce delay in the bandwidth request procedure, the 3-step bandwidth request procedure may be performed.

The process of the 5-step bandwidth request procedure and the 3-step bandwidth request procedure will now be described.

<Process of 5-Step Bandwidth Request Procedure>

Figure 4:
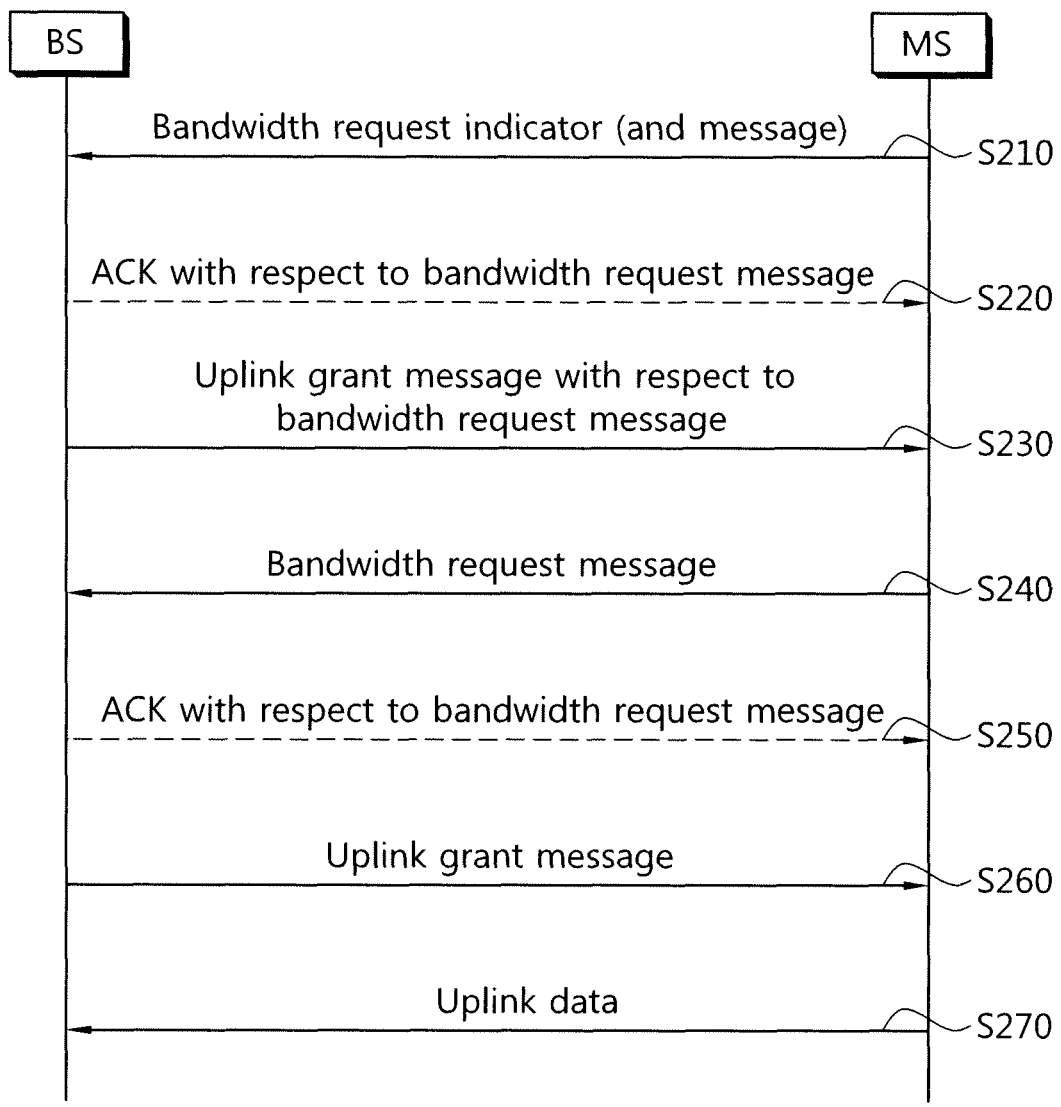
FIG. 4 is a view showing a 5-step bandwidth request procedure according to an exemplary embodiment of the present invention.

FIG. 4 is a view showing a 5-step bandwidth request procedure according to an exemplary embodiment of the present invention.

With reference to FIG. 4, the MS transmits a bandwidth request indicator to the BS (S210). As the bandwidth request indicator, one of predetermined orthogonal or semi-orthogonal code sets may be selected. The type, length, or the like, of the orthogonal or semi-orthogonal code used as the bandwidth request indicator are not limited. A plurality of orthogonal or semi-orthogonal code sets may be provided or different orthogonal or semi-orthogonal code sets may be used according to cells or sectors. The MS may transmit a first bandwidth request message including information required for a bandwidth allocation along with the bandwidth request indicator. The information required for a bandwidth allocation may include MS_ID, Flow ID, scheduling type, or the like. A portion or a reduced form of information required for a bandwidth allocation may be included in the first bandwidth request message transmitted along with the bandwidth request indicator in the 5-step bandwidth request procedure. The first bandwidth request message may include the entirety of a portion of the MS_ID. A portion of the MS_ID may be configured to have a form in which some bits, starting from an LSB (least significant bit) or an MSB (most significant bit), of the entire MS_ID are omitted. The bandwidth request indicator may be transmitted via a contention-based bandwidth request channel. The first bandwidth request message may be a message of a MAC (media access control) layer, an upper layer of a physical layer.

The BS can find a sequence selected by the MS by correlating the entire orthogonal or semi-orthogonal code sets to the bandwidth request indicator received from the MS. The bandwidth request indicator may not be transmitted via a predefined bandwidth request channel, or one or more bandwidth request indicators may be transmitted. The BS finds the first bandwidth request message with respect to the bandwidth request indicator. When a CRC is included in the first bandwidth request message, error detection for the first bandwidth request message is performed based on the CRC. When the first bandwidth request message does not include a CRC, error detection for the first bandwidth request message can be performed based on an RSSI (Received Signal Strength Indication), CINR (Carrier to Interference Ratio), or the like.

When the first bandwidth request message with respect to the bandwidth request indicator is not received or when an error occurs, the BS ma perform the 5-step bandwidth request procedure. Namely, the MS performs the bandwidth request procedure only with the bandwidth request indicator. When the first bandwidth request message with respect to the bandwidth request indicator is received without an error, the BS may perform the 5-step bandwidth request procedure or the 3-step bandwidth request procedure. Here, the case in which the 5-step bandwidth request procedure is performed will be described.

The BS may transmit an ACK (Acknowledgement) signal with respect to the bandwidth request indicator to the MS (S220). The ACK signal may be transmitted at a determined period or may be omitted.

The BS may transmit an uplink (UL) grant message for the second bandwidth request message (S230). When the BS detects only the bandwidth request indicator, the BS transmits the uplink grant message for the second bandwidth request message. Hereinafter, the uplink grant message for the second bandwidth request message will be referred to as a 'control grant message'. The control grant message may include such information as shown in Table 3 below.

TABLE 3

| Information | Note |
| --- | --- |
| UL grant type | UL grant when only bandwidth request indicator is detected |
| Confirm BW REQ indicator | Sequence index, area information of received BW REQ indicator |
| Resource for BW REQ message | BW REQ header area or non-contention-based BW REQ area |
| CRC or broadcast MS_ID | MS_ID or UL grant type masking |

The control grant message may include (1) information regarding the type of the uplink grant message, (2) confirmation information regarding bandwidth request indicator, (3) information regarding uplink radio resource allocation with respect to second bandwidth request message, and (4) a CRC, and the like.

The information regarding the type of an uplink grant message is information for determining the type of a grant message used in the 5-step bandwidth request procedure and the 3-step bandwidth request procedure. Here, the information regarding the type of an uplink grant message indicates an uplink grant message with respect to a case in which only a bandwidth request indicator is detected. The information regarding the type of an uplink grant message may be transmitted through a separate resource area or may be masked in a CRC so as to be transmitted. For example, when a 12-bit MS_ID is masked in a 16-bit CRC, the information regarding the type of an uplink grant message may be masked in the remaining 4 bits and transmitted.

The confirmation information regarding the bandwidth request indicator indicates a sequence index, a resource area, or the like, of the bandwidth request indicator received by the BS. An orthogonal or semi-orthogonal code set used as the bandwidth request indicator may be divided for various purposes, and the bandwidth request indicator may indicate additional information regarding the purpose of the orthogonal or semi-orthogonal code set. For example, when the orthogonal or semi-orthogonal code set of the bandwidth request indicator is classified to be used according to the 5-step bandwidth request procedure and the 3-step bandwidth request procedure, confirmation information regarding the bandwidth request indicator ma indicate a threshold value with respect to the determination of the bandwidth request procedures to indicate whether or not a bandwidth request procedure to be performed thereafter is the 3-step bandwidth request procedure or the 5-step bandwidth request procedure.

The uplink radio resource allocation information regarding the second bandwidth request message may indicate a resource area for transmitting a header of the bandwidth request message to be transmitted by the MS later or a resource area for transmitting a non-contention-based bandwidth request message in the non-contention-based bandwidth request procedure.

The CRC is used for error detection for the control grant message. An MS_ID or the information regarding the type of the uplink grant message may be masked in the CRC. When the MS does not transmit the first bandwidth request message or when the first bandwidth request message has an error, the BS cannot know about the MS_ID of the MS. The BS may not mask the MS_ID or mask a broadcast MS_ID in the CRC. The broadcast MS_ID is arbitrarily assigned to the MS in order to perform a follow-up bandwidth request procedure. When the broadcast MS_ID is not masked in the CRC or when bits of the broadcast MS_ID are smaller than bits of the CRC, the information regarding the type of the uplink grant message included in the control grant message may be masked in the CRC.

The MS transmits the second bandwidth request message through uplink radio resource allocated through the control grant message (S240). The second bandwidth request message may be a message of the MAC layer. The second bandwidth request message may include the entirety of information required for a bandwidth allocation or may include remaining information not included in the first bandwidth request message. The second bandwidth request message may include the entire MS_ID, the Flow ID, the size of requested radio resource, scheduling type, or the like.

The BS may transmit an ACK signal with respect to the second bandwidth request message (S250). The ACK signal may be transmitted at a predetermined period or may be omitted.

The BS transmits the uplink grant message for the uplink data (S260). Hereinafter, the uplink grant message for the uplink data will be referred to as a data grant message. The data grant message in the 5-step bandwidth request procedure may include such information as shown in Table 4 below.

TABLE 4

| Information | Note |
| --- | --- |
| UL grant type | UL grant for UL data transmission |
| Confirm BW REQ indicator | Confirm received BW REQ message and requested radio resource |
| Resource for UL data | Position and size of uplink radio resource for UL data transmission |
| CRC or broadcast MS_ID | MS_ID or UL grant type masking |

The data grant message may include (1) information regarding the type of an uplink grant message, (2) confirmation information regarding a bandwidth request message, (3) information regarding an uplink radio resource allocation with respect to uplink data, and (4) a CRC, and the like.

The information regarding the type of an uplink grant message indicates that a message is an uplink grant message for an uplink data transmission. The information regarding the type of an uplink grant message may be transmitted through a separate resource area or may be masked in the CRC so as to be transmitted. The confirmation information regarding a bandwidth request message indicates whether or not an MS_ID, a Flow ID, the size of requested radio resource, a scheduling type, and the like, included in a bandwidth request message received by the BS has been confirmed. The information regarding an uplink radio resource allocation with respect to uplink data indicates the position and size of uplink radio resource allocated to the MS by reflecting the size of radio resource requested by the MS. The CRC is used for error detection for a data grant message. The entire MS_ID or the information regarding the type of an uplink grant message may be masked in the CRC. When bits of the entire MS_ID are smaller than bits of the CRC, the information regarding the type of an uplink grant message included in the data grant message may be masked in the CRC.

The MS transmits the uplink data through the allocated uplink radio resource according to the data grant message (S270). The uplink data may not include the entire MS_ID. Since the BS knows about the entire MS_ID, the entire MS_ID may not be necessarily transmitted.

When the MS transmits only the bandwidth request indicator, the 3-step bandwidth request procedure may be performed in the following case.

(1) It is the case in which the terminal arbitrarily performs the 3-step bandwidth request procedure. When the BS transmits an uplink grant message for the second bandwidth request message, the MS may arbitrarily transmit uplink data instead of the second bandwidth request message. In this case, the BS can determine whether or not it is the second bandwidth request message or uplink data upon checking a header type, or the like, of the data transmitted by the MS. Accordingly, the 3-step bandwidth request procedure, omitting steps S240 to S260, may be performed.

(2) It is the case in which the BS arbitrarily performs the 3-step bandwidth request procedure. The BS may arbitrarily transmit a data grant message instead of transmitting an uplink grant message (control grant message for the second bandwidth request message. The MS may determine whether or not it is a control grant message or a data grant message through the information regarding the type of the uplink grant message. Thus, steps S230 to S250 can be omitted, and the 3-step bandwidth request procedure can be performed.

<Process of 3-Step Bandwidth Request Procedure>

Figure 5:
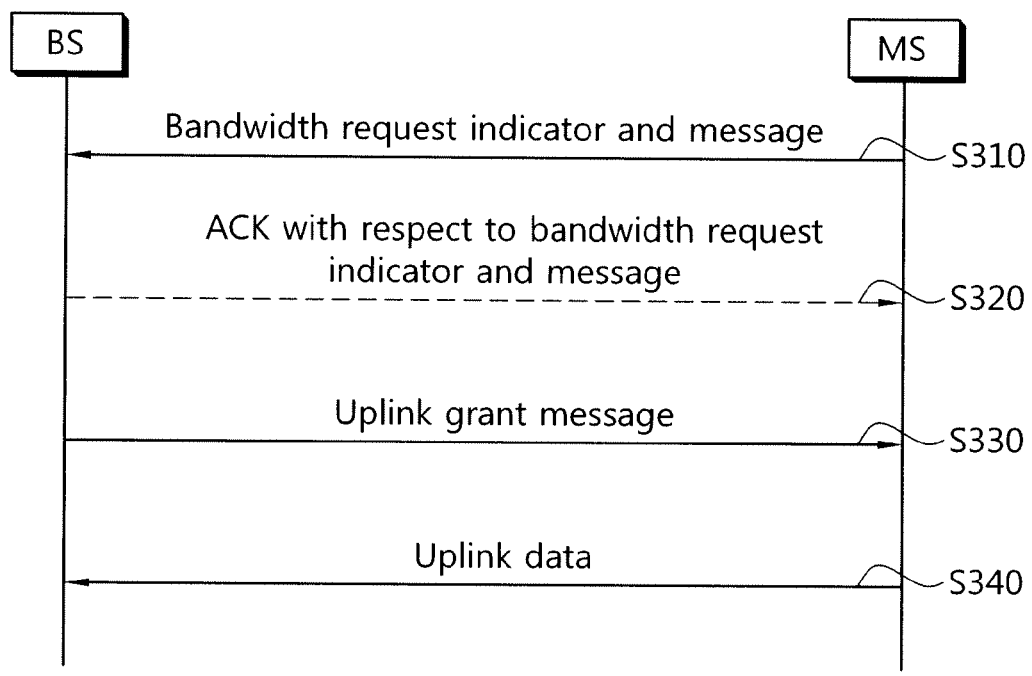
FIG. 5 is a view showing a 3-step bandwidth request procedure according to an exemplary embodiment of the present invention.

FIG. 5 is a view showing a 3-step bandwidth request procedure according to an exemplary embodiment of the present invention.

With reference to FIG. 5, the MS transmits a bandwidth request indicator and a bandwidth request message to the BS (S310). The bandwidth request indicator and the bandwidth request message may be transmitted via a contention-based bandwidth request channel. As the bandwidth request indicator, one of predetermined orthogonal or semi-orthogonal sets may be arbitrarily selected. A transmission of a large amount of information via the contention-based bandwidth request channel may cause a waste of radio resource, so minimum information required for a bandwidth allocation must be included in the bandwidth request message. The bandwidth request message may include an MS_ID, a QoS ID, a Flow ID, a buffer size indicating the size of radio resource, a reception power level, or the like. The QoS ID is a QoS index comprised of a scheduling type of a bandwidth request, priority, and the like. The bandwidth request message may include the entire MS_ID or a portion of the MS_ID. A portion of the MS_ID may have some of bits of the entire MS_ID. A portion of the MS_ID may be configured to have a form in which some bits, starting from an LSB (least significant bit) or an MSB (most significant bit), of the entire MS_ID are omitted.

The BS can find an orthogonal or semi-orthogonal code selected by the MS by correlating the entire orthogonal or semi-orthogonal code sets to the bandwidth request indicator received from the MS. The bandwidth request indicator may not be transmitted via a predefined bandwidth request channel, or one or more bandwidth request indicators may be transmitted. The BS finds the bandwidth request message with respect to the bandwidth request indicator. The BS may estimate a channel with respect to the bandwidth request message by using the bandwidth request indicator, and demodulate it. When a CRC is included in the bandwidth request message, error detection for the bandwidth request message is performed based on the CRC. When the bandwidth request message does not include a CRC, error detection for the bandwidth request message is performed based on an RSSI (Received Signal Strength Indication), CINR (Carrier to Interference Ratio), or the like. When the bandwidth request message is received without an error, the BS performs the 3-step bandwidth request procedure.

The BS may transmit an ACK signal with respect to the bandwidth request indicator and the bandwidth request message to the MS (S320). The ACK signal may be transmitted at a determined period or may be omitted.

The BS transmits an uplink grant message for uplink data (S330). The uplink grant message for uplink data may be referred to as a data grant message. The BS generates a data grant message by using information included in the bandwidth request message transmitted by the MS, and transmits it. In the 3-step bandwidth request procedure, the data grant message may include such information as shown in Table 5 below.

TABLE 5

| Information | Note |
| --- | --- |
| UL grant type | UL grant in case in which bandwidth request and message are all detected |
| Confirm BW REQ indicator and message | Sequence index of received BW REQ indicator, MS_ID, area information |
| Resource for UL data | Position and size of uplink radio resource for UL data transmission |
| CRC or broadcast MS_ID | MS_ID or UL grant type masking |

In the 3-step bandwidth request procedure, the data grant message may include (1) information regarding the type of an uplink grant message, (2) confirmation information regarding a bandwidth request indicator and a bandwidth request message, (3) information regarding an uplink radio resource allocation with respect to uplink data, and (4) a CRC, and the like.

The information regarding the type of an uplink grant message indicates that a message is an uplink grant message when a bandwidth request indicator and a bandwidth request message are detected. The information regarding the type of an uplink grant message may be transmitted through a separate resource area or may be masked in the CRC so as to be transmitted. For example, when a 12-bit MS_ID is masked in a 16-bit CRC, the information regarding the type of an uplink grant message may be masked in the remaining 4 bits and transmitted.

The confirmation information regarding a bandwidth request indicator and a bandwidth request message indicates a sequence index of the bandwidth request indicator received by the BS, the entirety of the received MS_ID or a portion of the MS_ID, a Flow ID, the size of requested radio resource, a scheduling type, a resource area regarding a received bandwidth request (e.g., a bandwidth request indicator and the number of a frame in which a message has been transmitted).

The information regarding an uplink radio resource allocation with respect to uplink data indicates the position and size of uplink radio resource allocated to the MS by reflecting the size of radio resource requested by the MS.

The CRC is used for error detection for a data grant message. The MS_ID or the information regarding the type of uplink grant message may be masked in the CRC. When the BS knows about the entire MS_ID, the entire MS_ID may be masked in the CRC. When the BS knows only about a portion of the MS_ID, only the portion of the MS_ID may be masked in the CRC, or a portion of the MS_ID and the other remaining portion of the MS_ID may be masked as a pre-designated value (e.g., 0) in the CRC. When bits of the entire MS_ID are smaller than bits of the CRC, the information regarding the type of an uplink grant message included in the data grant message for the 3-step bandwidth request may be masked in the CRC.

The MS transmits the uplink data through the allocated uplink radio resource according to the data grant message (S340). The MS receives an uplink grant message, and when the frame number, sequence index, and the like, of the bandwidth request message it transmitted are identical, the MS transmits uplink data through radio resource indicated by the BS. When the MS had included the entire MS_ID in the bandwidth request message and transmitted the same, the MS does not need to include the entire MS_ID in the uplink data and transmit the same. However, when the MS had included only a portion of the MS_ID in the bandwidth request message and transmitted the same, the MS must inform the BS about the entire MS_ID. When the 3-step bandwidth request procedure is performed by using a portion of the MS_ID, the portion of the MS_ID may be identical, although the entire MS_ID is different, potentially causing a collision with a different MS. For example, when the Flow ID or the scheduling type included in the bandwidth request message is different or the transmission frame number or the sequence index is different, the bandwidth request message can be detected. However, if there are MSs whose information are all identical and only the entire MS_IDs are different, the BS cannot decode the bandwidth request message, and the MS must attempt the 3-step bandwidth request procedure again or must perform the 5-step bandwidth request procedure. This may cause delay in the bandwidth request procedure.

Thus, in order to prevent the problem, the MS may add an extended header including the entire MS_ID or the other remaining portion excluding the one portion of the entire MS_ID to the uplink data to inform the BS about the entire MS_ID. Namely, the format of the uplink data may vary according to whether or not the entire MS_ID is included in the bandwidth request message in the bandwidth request procedure. Also, the format of the uplink data may vary according to whether or not the BS has recognized the MS_ID (station ID) of the MS to which the uplink bandwidth is to be allocated.

<Format of Uplink Data in Bandwidth Request Procedure>

Figure 6:
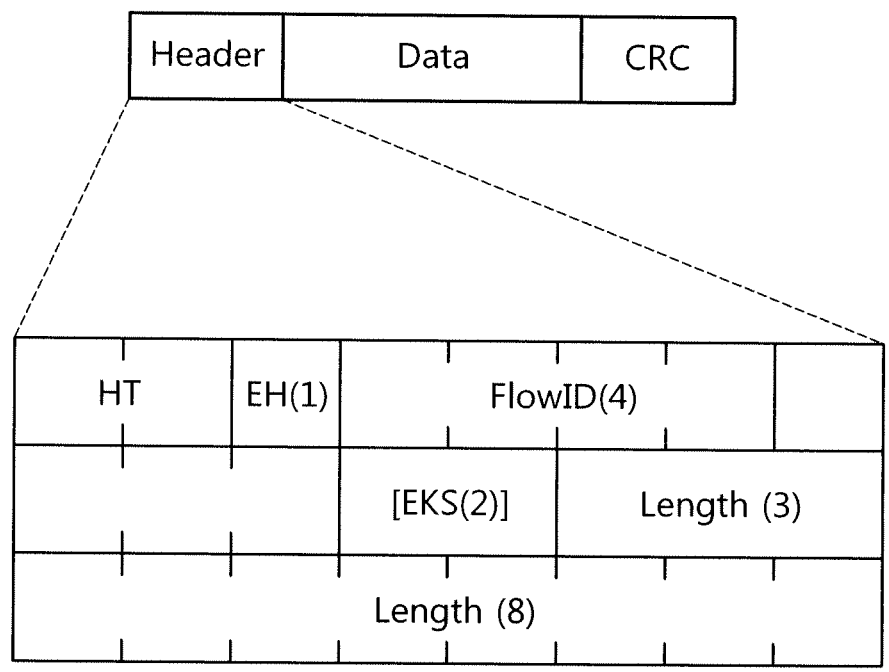
FIG. 6 is a view showing an example of an uplink data format used in a bandwidth request procedure.

FIG. 6 is a view showing an example of an uplink data format used in a bandwidth request procedure.

With reference to FIG. 6, the 5-step bandwidth request procedure or in the 3-step bandwidth request procedure, when the entire MS_ID is included in a bandwidth request message and transmitted, the BS may know about the entire MS_ID of the MS. Accordingly, when the BS allocates uplink resource to the MS in a state in which it recognizes the MS_ID of the MS to which uplink resource is to be allocated, the MS does not need to inform the entire MS_ID when it transmits uplink data. The MS includes a generic MAC header and a CRC in the uplink data and transmits the same.

The generic MAC header is used to transmit general data. The generic MAC header includes a plurality of fields and may be used for a downlink transmission as well as for the uplink transmission. The fields included in the generic MAC header include an HT (Header Type), an EH (Extended Header Presence Indicator), a Flow ID, an EKS (Encryption Key Sequence), a Length, and the like. The HT indicates the type of a header. The EH indicates the presence or absence of an extended header following the generic MAC header. The Flow ID indicates the address of Flow, the EKS indicates an encryption sequence, and the length indicates the length of payload. The number in parenthesis of each field indicates the bit number of each field. The bit number of each field is not limited.

Figure 7:
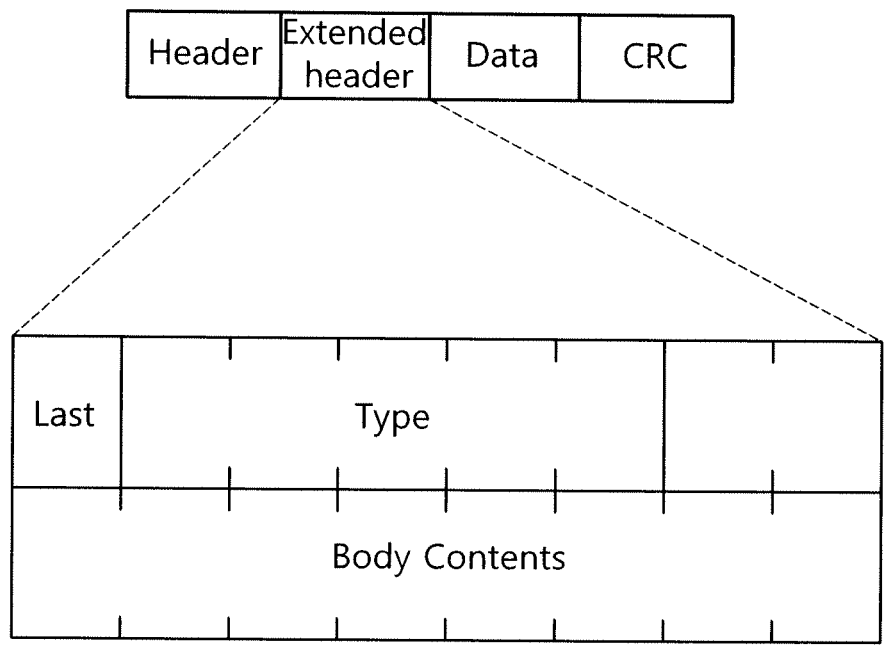
FIG. 7 is a view showing another example of an uplink data format used in a bandwidth request procedure.

FIG. 7 is a view showing another example of an uplink data format used in a bandwidth request procedure.

With reference to FIG. 7, in the 3-step bandwidth request procedure, when a bandwidth request message is transmitted in a state in which a portion of MS_ID is included or none is included in the bandwidth request message, the BS cannot know about the entire MS_ID of the MS. Also, when only a bandwidth request indicator is transmitted in the 5-step bandwidth request, the BS cannot know about the MS_ID of the MS. Thus, the MS must inform the BS about the entire MS_ID in transmitting uplink data. The MS includes a generic MAC header, an extended header, and a CRC in the uplink data, and transmits the same.

Whether to include the extended header is indicated by the EH field of the generic MAC header. The extended header includes fields such as Last, Type, Body Content, and the like. The Last indicates whether or not the extended header is the last extended header. The uplink data may include a plurality of extended headers, and the Last field is not assigned to the last extended header, thus indicating the last extended header. The Type indicates the type of the extended header, and the Body Content includes various types of information according to the Type. The length of the Body Content may vary according to included information.

When the entire MS_ID is included in the uplink data, the entire MS_ID may be included in the Body Content field of the extended header. Or, when the other remaining portion, excluding the one portion, of the entire MS_ID is included in the uplink data, the remaining MS_ID may be included in the Body Content field of the extended header. The type of the MS_ID included in the Body Content field may be indicated according to the type of the Type field. When additional uplink radio resource is required in transmitting the uplink data, the MS may include the size of required bandwidth along with the entire MS_ID in the extended header and transmit the same. The size of the required bandwidth may also be included in the Body Content field, and indicated according to the type of the Type field.

In the 3-step bandwidth request procedure, a case in which a portion of the MS_ID is transmitted via a contention-based bandwidth request channel and only an MS allocated uplink radio resource transmits the entire MS_ID or the other remaining portion of the MS_ID in the uplink data can be more effective compared with a case in which all the MSs transmit the entire MS_ID via the contention-based bandwidth request channel.

<Process of Bandwidth Request Procedure in Consideration of Reliability of Bandwidth Request Indicator>

A terminal which is initially connected, a terminal which performs handover, or a terminal which is in an idle state for a long period of time cannot accurately know about an SINR (Signal to Interference plus Noise Ratio) due to inaccuracy of power control, so it may not be able to estimate an appropriate threshold value for a correlation of a bandwidth request indicator. This may degrade the detection performance of the bandwidth request indicator in the 5-step bandwidth request procedure or the 3-step bandwidth request procedure. In particular, a severe performance degradation may be caused in the 3-step bandwidth request procedure in which a channel with respect to a bandwidth request message is estimated by using a detected bandwidth request indicator and demodulated. Thus, in order to prevent the degradation of performance in the bandwidth request procedure, the amount of information included in the bandwidth request message transmitted together with the bandwidth request indicator must be minimized.

Figure 8:
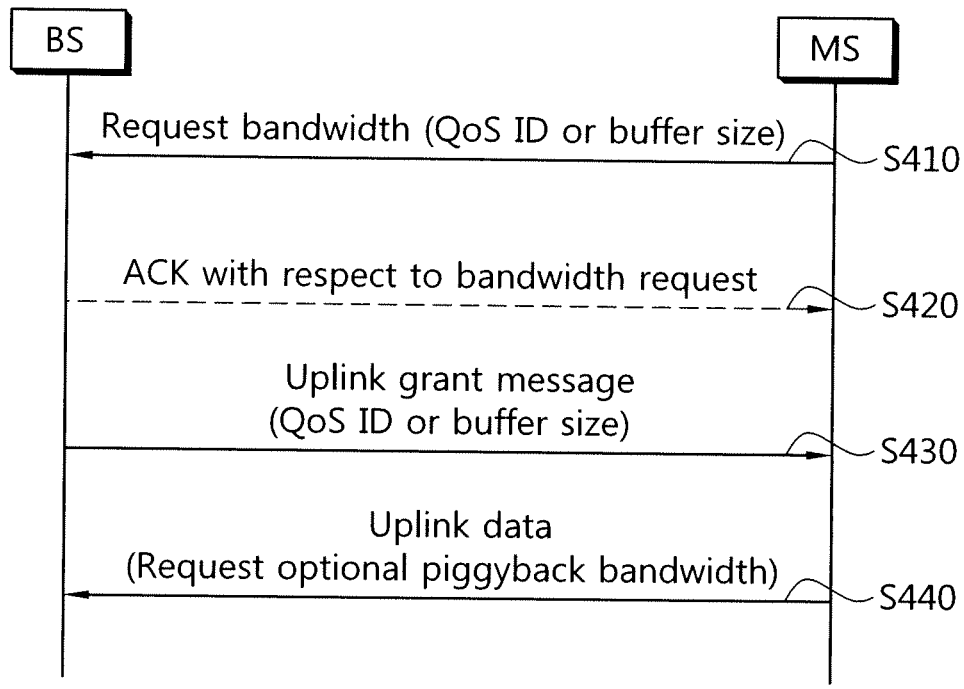
FIG. 8 is a view showing a bandwidth request procedure for minimizing the amount of information of a bandwidth request message according to an exemplary embodiment of the present invention.

FIG. 8 is a view showing a bandwidth request procedure for minimizing the amount of information of a bandwidth request message according to an exemplary embodiment of the present invention.

With reference to FIG. 8, the MS transmits a bandwidth request indicator and a bandwidth request message to the BS (S410). In order to guarantee the reliability of the performance of estimating the bandwidth request indicator, the bandwidth request message includes a minimum amount of information. For example, the bandwidth request message may include at least any one of a QoS ID and a buffer size, and a CRC. The QoS ID is a QoS index comprised of a scheduling type, priority, and the like of a bandwidth request. The buffer size indicates the size of radio resource requested by the MS. Namely, the MS_ID of the MS, the Flow ID, or the like, is not included in the bandwidth request message. Accordingly, the BS can perform the bandwidth request procedure without knowledge of the MS requesting a bandwidth request.

The BS may transmit an ACK signal with respect to the bandwidth request indicator and the bandwidth request message to the MS (S420). The ACK signal may be transmitted at a determined period or may be omitted.

The BS cannot know about which terminal has transmitted the bandwidth request indicator by using which sequence, so it performs CRC checking on all the orthogonal or semi-orthogonal codes used as the bandwidth request indicators.

When a CRC error is not detected from a particular orthogonal or semi-orthogonal code, the BS transmits an uplink grant message including information regarding the bandwidth request message (QoS ID or buffer size) received along with a point in time when the corresponding orthogonal or semi-orthogonal code and the bandwidth request indicator were transmitted. The point in time when the bandwidth request indicator can be expressed by at least any one of a frame number, a slot, a transmission opportunity, a subframe number, a bandwidth request channel index.

The uplink grant message may be transmitted at an arbitrary point in time or at a fixed point in time. (1) When the uplink grant message is transmitted at an arbitrary point in time, the uplink grant message must include at least any one of the frame number, a slot, a transmission opportunity, a subframe number, a bandwidth request channel index, namely, a point in time when the bandwidth request indicator was transmitted. (2) When the uplink grant message is transmitted at a fixed point in time, if the MS knows about the information regarding the transmission opportunity, the bandwidth request channel index, or the like, it can know about the point in time when the uplink grant message is transmitted.

In a state in which the MS receives the uplink grant message, when the bandwidth request message transmitted by the MS, the transmission point in time, the sequence, or the like, are identical, the MS transmits uplink data through uplink radio resource indicated by the BS (S440). The MS_ID of the MS, the Flow ID, or the like, are included in the header of the uplink data and transmitted. The Flow ID may be included in the generic MAC header of the uplink data and the MS_ID of the MX may be included in the extended header. The BS can recognize the MS requesting bandwidth through the MS_ID and the Flow ID included in the uplink data. When the MS has uplink data to be transmitted thereafter, it may a bandwidth request message in the uplink data in a piggyback manner.

Meanwhile, when the BS does not have radio resource to be immediately allocated although a CRC error with respect to the bandwidth request message has not been detected, the BS may transmit an ACK signal. In this case, the BS cannot know about whether which of MSs has requested bandwidth, so (1) it may broadcast a corresponding sequence and a bandwidth request message through a separate channel, (2) it may transmit an uplink grant message with a predetermined value (e.g., 00 . . . 0), or (3) it may include an indicator (e.g., 0 indicates a data transmission following a determined time and 1 indicates an immediate transmission) with respect to the ACK signal in the uplink grant message.

In this manner, through the method of performing the bandwidth request indicator and the bandwidth request message in a state in which the BS does not know about an MS requesting bandwidth, the reliability of the bandwidth request indicator and the bandwidth request message can be improved. Also, since only the minimum amount of information is included in the bandwidth request message, the burden of decoding the bandwidth request message can be reduced and the duration of the bandwidth request procedure can be shortened. When several MSs simultaneously transmit a bandwidth request message including the same information, the MSs are likely to collide, but a case in which the sequence index used as the bandwidth request indicator, the QoS ID included in the bandwidth request message, or the buffer size are the same scarcely occurs. Thus, the accurate and quick bandwidth request procedure can be performed without the problem of the reliability of detecting the bandwidth request indicator due to a failure of an appropriate threshold value for a correlation of the bandwidth request indicator by the MS or the degradation of the performance due to the collision of the bandwidth request indicator. Also, even when two or more MSs use the same bandwidth request indicator, if only one MS has successfully undergone the CRC checking, the regular 3-step bandwidth request procedure can be performed. When an error occurs in the CRC checking with respect to the bandwidth request message, the BS may perform the 5-step bandwidth request procedure through the method of detecting the bandwidth request indicator using the threshold value.

In performing the 5-step bandwidth request procedure, the MS may transmit a first bandwidth request message without the MS_ID of the MS included therein. Namely, the 5-step bandwidth request procedure can be performed in a state in which the BS does not know about an MS requesting bandwidth. In this case, the MS may include its MS_ID in a second bandwidth request message or in uplink data and transmit the same. Even in the 5-step bandwidth request procedure, the reliability of the bandwidth request indicator and the bandwidth request message can be improved.

<Method for Selecting Bandwidth Request Procedure>

As described above, the 3-step bandwidth request procedure is for quickly performing the bandwidth request, and the 5-step bandwidth request procedure is for stably performing the contention-based bandwidth request procedure. The subject for determining whether to perform which of the bandwidth request procedures may be the BS or the MS.

Figure 9:
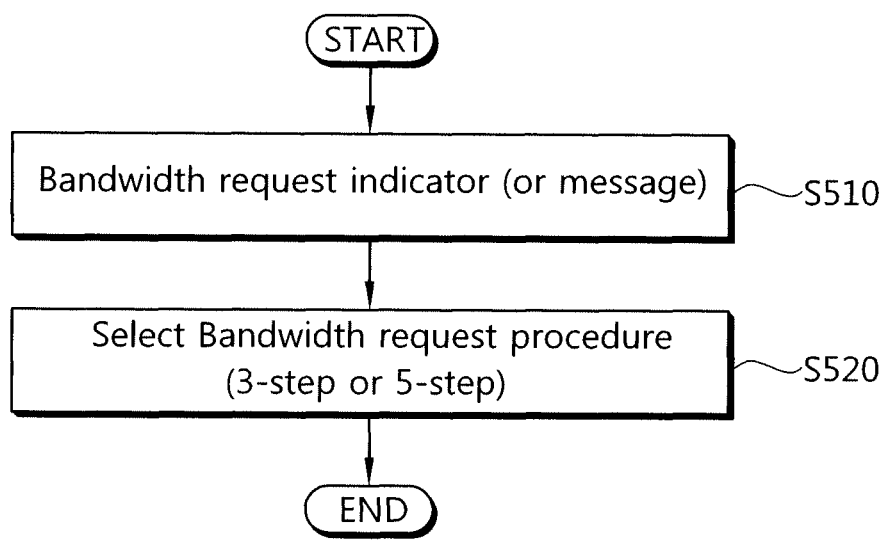
FIG. 9 is a flow chart illustrating the process of a method for selecting a bandwidth request procedure according to an exemplary embodiment of the present invention.

FIG. 9 is a flow chart illustrating the process of a method for selecting a bandwidth request procedure according to an exemplary embodiment of the present invention.

With reference to FIG. 9, the MS transmits a bandwidth request indicator or a bandwidth request message along with the bandwidth request indicator to the BS in order to request bandwidth (S510). In the 3-step bandwidth request procedure, the MS transmits the bandwidth request indicator and the bandwidth request message. In the 5-step bandwidth request procedure, the MS may transmit only the bandwidth request indicator, or the bandwidth request message along with the bandwidth request indicator.

The BS may selectively perform the 3-step bandwidth request procedure or the 5-step bandwidth request procedure through the bandwidth request indicator or the bandwidth request message received from the MS (S520). The MS may select a desired bandwidth request procedure in the process of transmitting the bandwidth request indicator or the bandwidth request message, and the BS may select a bandwidth request to be performed in the process of receiving the bandwidth request indicator or the bandwidth request message.

Table 6 below shows an example of a reference for selecting a bandwidth request procedure by the BS or the MS.

TABLE 6

| Selection subject | Selection reference | Bandwidth request procedure |
| --- | --- | --- |
| BS | bandwidth request indicator and message reception state | 3-step: bandwidth request indicator and message are received or only bandwidth request indicator is received<br>5-step: only bandwidth request indicator is received |
| MS | Whether or not bandwidth request message is transmitted | 3-step: bandwidth request indicator and message are transmitted or only bandwidth request indicator is transmitted<br>5-step: only bandwidth request indicator is transmitted |

TABLE 6-continued

| Selection subject | Selection reference | Bandwidth request procedure |
|---|---|---|
| | Subset discrimination of bandwidth request indicator | Discriminated according to service type<br>3-step: Sequence with respect to real time service is transmitted<br>5-step: sequence with respect to non-real time service is transmitted<br>According to arbitrary selection,<br>3-step: sequence for 3-step bandwidth request is transmitted<br>5-step: sequence for 5-step bandwidth request is transmitted |

When a bandwidth request is transmitted together with a bandwidth request indicator, the BS may check a reception state of the bandwidth request indicator and the bandwidth request message to determine a bandwidth request procedure. When the bandwidth request message is received along with the bandwidth request indicator, the 3-step bandwidth request procedure is performed. When only the bandwidth request indicator is received, e.g., when the MS transmits only the bandwidth request indicator, or when the BS can detect only the bandwidth request indicator because of an error generated in the bandwidth request message, the 5-step bandwidth request procedure may be selected. Or, the BS or the MS can arbitrarily select the 3-step bandwidth request procedure. Of course, when the BS cannot receive both the bandwidth request indicator and the bandwidth request message, the bandwidth request procedure fails, and the MS re-attempts the bandwidth request procedure.

When the MS wants to perform the 3-step bandwidth request procedure, it may transmit only the bandwidth request indicator, and when the MS wants to perform the 5-step bandwidth request procedure, it may transmit the bandwidth request message together with the bandwidth request indicator to determine the bandwidth request procedure.

An orthogonal or a semi-orthogonal code may be used as a sequence of the bandwidth request indicator. Thus, the bandwidth request indicator may be transmitted in a bandwidth request channel according to a CDM (Code Division Multiplexing) method, and the sequence of the bandwidth request indicator can be easily discriminated. A code set used as the bandwidth request indicator may be discriminated as a subset for determining the bandwidth request procedure.

The subset of the bandwidth request indicator may be discriminated according to a service type. For example, the service type includes a real time service such as a VoIP (Voice over Internet Protocol) and a non-real time service such as a general data service. The subset of the bandwidth request indicator may be divided into a sequence with respect to a real time service and a sequence with respect to a non-real time service. The real time service is sensitive to delay, and the non-real time service is relatively insensitive. A quicker bandwidth request procedure needs to be performed for the service sensitive to delay. Thus, when a service of the MS is sensitive to delay, the MS may select and transmit the sequence with respect to the real time service, and when its service is not sensitive to delay, the MS may select and transmit the sequence with respect to the non-real time service. Namely, the MS may selectively transmit the subset of the bandwidth request indicator according to its service type. When the sequence with respect to the non-real time service is transmitted from the MS, the BS may perform the 5-step bandwidth request procedure. When the sequence with respect to the real time service is transmitted from the MS, the BS may perform the 3-step bandwidth request procedure. When a data packet having a uniform size such as VoIP is used, the BS may allocate radio resource having a predefined particular size to perform the 3-step bandwidth request procedure.

The subset of the bandwidth request indicator may be discriminated into a sequence for the 3-step bandwidth request and a sequence for the 5-step bandwidth request. The discrimination information of the sequence for the 3-step bandwidth request and the sequence for the 5-step bandwidth request or index information of the discriminated sequences may be broadcast. The MS generates a certain number and compares it with a threshold value based on the sequence discrimination information. For example, when 19 sequences are provided as the bandwidth request indicators, the BS may determine 17 sequences as sequences for the 5-step bandwidth request and the remaining two sequences as sequences for the 3-step bandwidth request, and inform the MS accordingly through a broadcast channel. When a bandwidth request is required, the MS generates a certain number q and compares it with a threshold value p. The MS may select either the 3-step bandwidth request procedure or the 5-step bandwidth request procedure according to whether or not a>p. For example, in case in which the threshold value p is $2/19$ and $0<q\leq 1$, when q>p, the 5-step bandwidth request procedure may be performed, and when $q\leq p$, the 3-step bandwidth request procedure may be performed. When the 3-step bandwidth request procedure is selected, the MS transmits one of the sequences for the 3-step bandwidth request procedure through a bandwidth request channel. When the 5-step bandwidth request procedure is selected, the MS transmits one of the sequences for the 5-step bandwidth request procedure through the bandwidth request channel.

When an MS performing the 5-step bandwidth request procedure and an MS performing the 3-step bandwidth request procedure transmit a bandwidth request indicator through a single bandwidth request channel without discriminating sequences, the BS cannot know about which MS performs the 3-step bandwidth request procedure or the 5-step bandwidth request procedure. Thus, this problem can be solved by discriminating the subset of the bandwidth request indicator according to the bandwidth request procedure.

The bandwidth request indicator may be included in a pilot tone of a bandwidth request channel so as to be transmitted. The bandwidth request message may be included in a data tone of the same bandwidth request channel so as to be transmitted.

Figure 10:
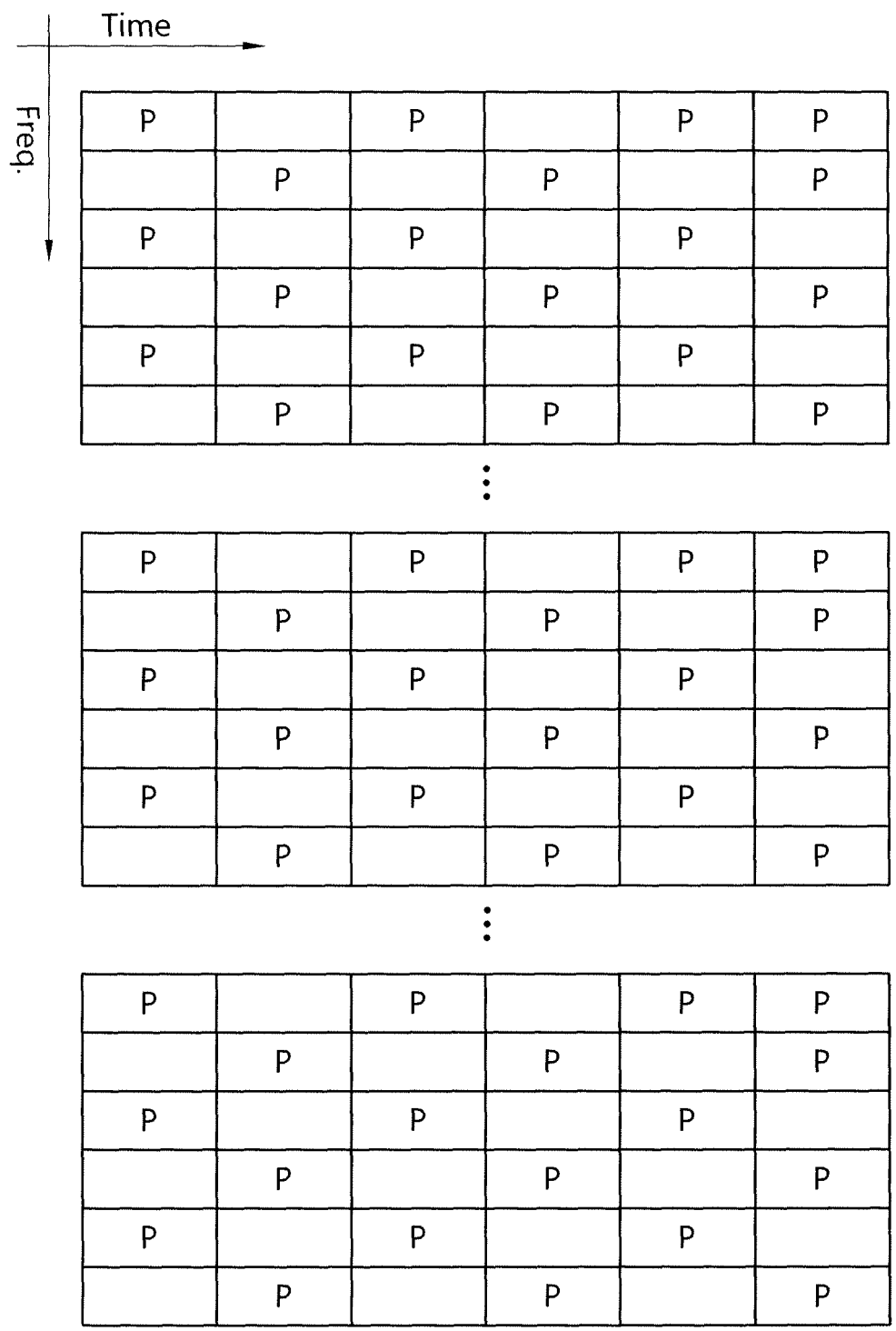
FIG. 10 is a view showing an example of a bandwidth request channel.

FIG. 10 is a view showing an example of a bandwidth request channel.

With reference to FIG. 10, a bandwidth request channel may include at least one bandwidth request tile. The bandwidth request channel may be comprised of three distributed bandwidth request tiles. Namely, the bandwidth request tiles included in the bandwidth request channel may be distributedly disposed in the frequency domain and the time domain. The bandwidth request tiles may be include a plurality of OFDM symbols in the time domain and include a plurality of subcarriers in the frequency domain. The bandwidth request tiles may include six contiguous subcarriers in six OFDM symbols.

The bandwidth request tiles may include a plurality of pilot tones (P) and a plurality of data tones (the residual excluding P). Bandwidth request sequences may be mapped to the pilot tones of the bandwidth request tiles, and bandwidth request messages may be mapped to the data tones. For example, the bandwidth request tiles may include 19 pilot tones and 17 data tones. The bandwidth request sequences may be mapped to the plurality of pilot tones, and based on which a channel estimation of the bandwidth request channels and user discrimination may be performed.

All the foregoing functions may be performed by processors such as a microprocessor, a controller, a microcontroller, an ASIC (Application Specific Integrated Circuit), or the like, according to software, program codes, or the like, coded to perform the functions. Designing, developing, and implementing the codes may be obvious to a person skilled in the art based on the description of the present invention.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of performing a bandwidth request (BR) to a base station (BS) in a wireless communication system, the method performed comprising:

determining, by a terminal, whether to perform a first type BR procedure or a second type BR procedure based on a type of a service provided by the BS, wherein the first type BR procedure is associated with a non-real time service and the second type BR procedure is associated with a real time service;

selecting, by the terminal, a first BR sequence among a first subset of available orthogonal sequences if the first type BR procedure is determined to be performed;

selecting, by the terminal, a second BR sequence among a second subset of the available orthogonal sequences if the second type BR procedure is determined to be performed;

transmitting, from the terminal to the BS, the first BR sequence if the first type BR procedure is determined to be performed; and transmitting, from the terminal to the BS, the second BR sequence and a first BR message comprising data associated with the BR if the second type BR procedure is determined to be performed, wherein the first BR message further comprises a first cyclic redundancy check (CRC) for error detection.

2. The method of claim 1, wherein when the first type BR procedure is determined to be performed the method for performing the BR further comprises:

receiving, in response to the first BR sequence, a first grant for uplink transmission, wherein the first grant comprises a second CRC masked with an identifier of the terminal;

transmitting, in response to the first grant, a second BR message comprising data associated with the BR; and receiving, in response to the second BR message a second grant for user data transmission, wherein the second grant comprises a third CRC masked with the identifier of the terminal.

3. The method of claim 1, wherein the bandwidth request is a contention-based bandwidth request.

4. The method of claim 1, wherein when the second type BR procedure is determined to be performed the method for performing the BR further comprises:

receiving, in response to the second BR sequence, a third grant for user data transmission.

* * * * *